United States Patent [19]

Pratt et al.

[11] Patent Number: 5,241,419
[45] Date of Patent: Aug. 31, 1993

[54] CO-AXIAL VIEWING DEVICE FOR LASERS

[75] Inventors: Vanon D. Pratt, Hamilton, Ohio; Eric J. Whitney, State College, Pa.; Ernest B. Cooper, Cincinnati, Ohio

[73] Assignee: General Electric Company, Cincinnati, Ohio

[21] Appl. No.: 826,496

[22] Filed: Jan. 27, 1992

[51] Int. Cl.$^5$ ............... G02B 27/14; G02B 23/04; B23K 26/02
[52] U.S. Cl. ................... 359/634; 359/629; 219/121.83
[58] Field of Search ............ 359/629, 634, 633, 583, 359/359, 589, 350; 219/121.83

[56] References Cited

U.S. PATENT DOCUMENTS

| | | | |
|---|---|---|---|
| 3,096,767 | 7/1963 | Gresser et al. | 219/121.83 |
| 3,387,109 | 6/1968 | Bruma et al. | 219/69 |
| 3,710,798 | 1/1973 | Bredemeier | 219/121.83 |
| 4,533,593 | 8/1985 | Miyata et al. | 359/359 |
| 4,645,924 | 2/1987 | Suzuki et al. | 250/236 |
| 4,668,088 | 5/1987 | Quinque et al. | 356/138 |
| 4,769,523 | 9/1988 | Tanimoto et al. | 356/400 |
| 4,873,414 | 10/1989 | Ma et al. | 219/121.7 |
| 4,918,284 | 4/1990 | Weisz | 219/121.83 |
| 4,934,799 | 6/1990 | Chu | 219/121.83 |
| 5,017,755 | 5/1991 | Yahagi et al. | 219/121.83 |
| 5,038,016 | 8/1991 | Robertson et al. | 219/121.83 |
| 5,041,714 | 8/1991 | Funk | 219/121.83 |

FOREIGN PATENT DOCUMENTS 144889  6/1988  Japan ................ 219/121.83

Primary Examiner—Jon W. Henry
Attorney, Agent, or Firm—Jerome C. Squillaro; Charles L. Moore, Jr.

[57] ABSTRACT

A welding apparatus operable with a high power $CO_2$ laser beam having a laser beam wavelength-corresponding coating on an optical window mounted in the beam path deflecting the reflected workpiece image into a viewing channel allowing a real-time observation of the welding.

21 Claims, 3 Drawing Sheets

CO-AXIAL VIEWING DEVICE FOR LASERS

FIELD OF THE INVENTION

The present invention relates generally to viewing devices for lasers, and more particularly, to an in process co-axial viewing device for lasers.

BACKGROUND OF THE INVENTION

During material processing by lasers it is desirable to be able to view the part or material to be processed along the axis of the laser beam, that is, to look at the part the same way the laser does. Such devices make part alignment much easier and much more accurate. As a result, product quality may increase along with improvement in process yield.

Devices are known for through-the-lens observation of the workpiece, which usually consist of a mirror or a prism that is moved in and out of the path of the laser beam. The primary disadvantage of such devices resides in that they must be removed from the beam path before the laser may be operated.

Other devices are known for similar observations which, however, require specially constructed mirrors, such as ring mirrors, to allow the power beam to pass through the middle of the optic.

OBJECTS AND SUMMARY OF THE INVENTION

It is, therefore, an object of the present invention to provide a viewing device for lasers which permits a real time through-the-lens observation of the operation and of the workpiece, and which eliminates the above-noted shortcomings of known observation devices.

It is another object of the present invention to provide an inventive viewing device of the above type, which permits to observe in real time the effect of a laser beam on the surface of a workpiece and, which is capable of yielding simultaneously substantial amount of process and phenomenological data.

It is still another object of the present invention to provide an inventive viewing device of the above type which includes a specially treated optic means capable of operating with a CO2 power laser.

It is yet another object of the present invention to provide an inventive viewing device of the above type, which is capable of yielding in real time data about substrate heating as a function of time and temperature, substrate melting, substrate vaporization, plasma generation and characteristics, filler metal additions and their effects on welding, weld puddle size, optical steering for joint tracking and focal distance for accurately controlling the process.

Accordingly, the present invention provides in an apparatus for material processing by a laser, a viewing device which permits a real time through-the-lens observation of the operation and of the workpiece.

The present invention according to another aspect thereof provides a viewing device of the above type, which permits to observe in real time the effect of a laser beam on the surface of a workpiece, and which is capable of yielding simultaneously substantial amount of process and phenomenological data.

The present invention according to still another aspect thereof provides a viewing device of the above type which includes a specially treated optic means capable of operating with a power laser.

The present invention according to yet another aspect thereof provides a viewing device of the above type which includes a specially treated optic means which is capable of operating with a CO2 power laser.

BRIEF DESCRIPTION OF THE DRAWINGS

The present invention will become more readily apparent from the following description of preferred embodiments thereof, shown and illustrated by way of example, and described in reference to the accompanying drawings, in which.

DESCRIPTION OF THE PREFERRED EMBODIMENTS

Figure 1:
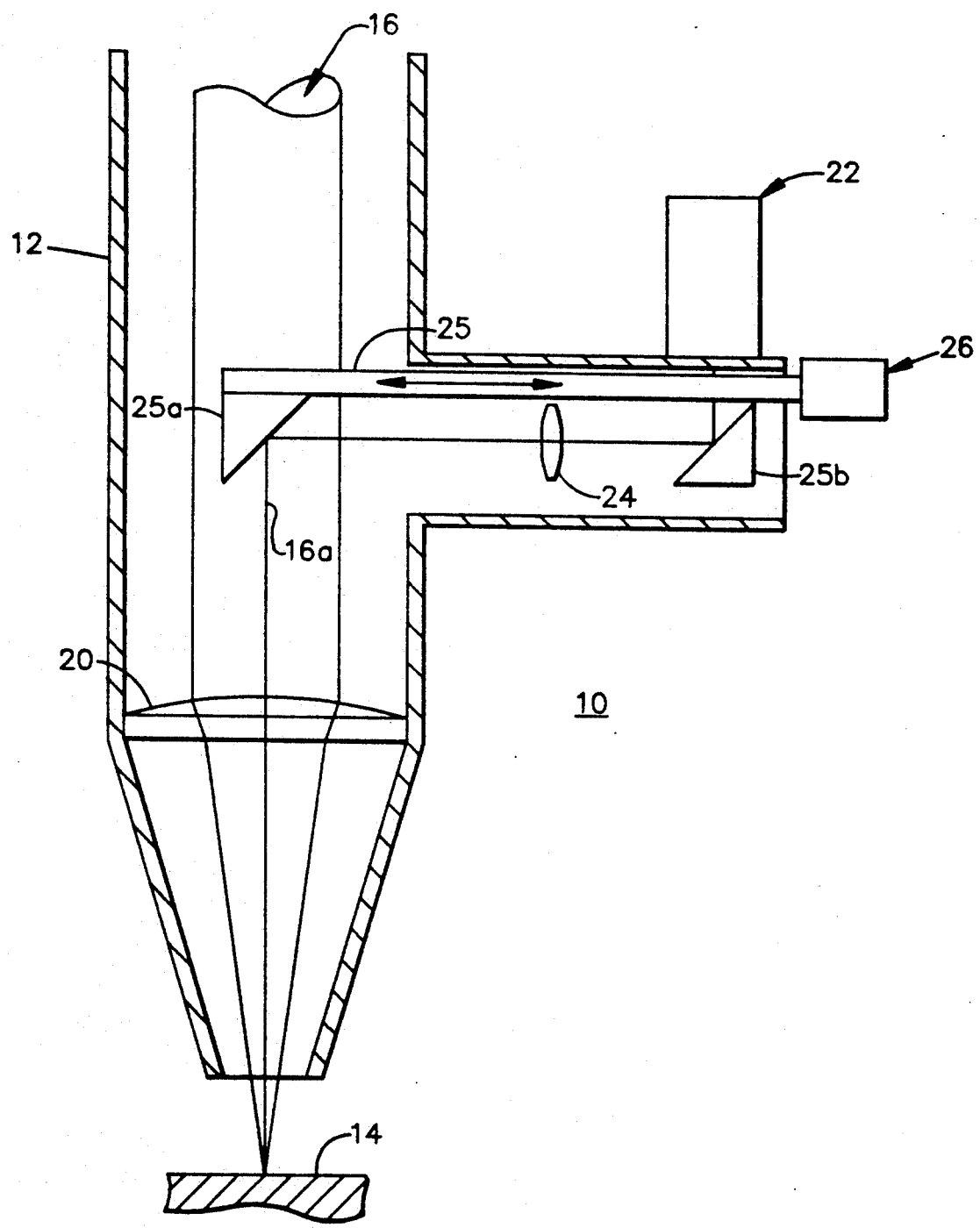
FIG. 1 is a schematic illustration, partly in section, of a viewing device for a material processing laser apparatus according to the prior art.

The moveable prism type prior art viewing device 10 illustrated in FIG. 1 includes a housing or beam tube 12 placed above a workpiece 14 in operational relationship therewith and through which a laser beam 16 is passed through a Zinc Selenide (ZnSe) laser focussing lens 20 to operate on the workpiece 14. In order to perform the observing operation, a moveable prism observing means 25 including a fine focus adjusting lens 24, a pair of prisms 25a, 25b, where prism 25a is moved axially in and out of the beam path by a prism translating slide 26 during off-time of the beam 16. The observation is transmitted to an imaging system 22 for further processing. The shortcoming of such device resides in that the operation must be discontinued in order that an observation could be performed since the beam cannot pass through the prism means 25a.

Figure 2:
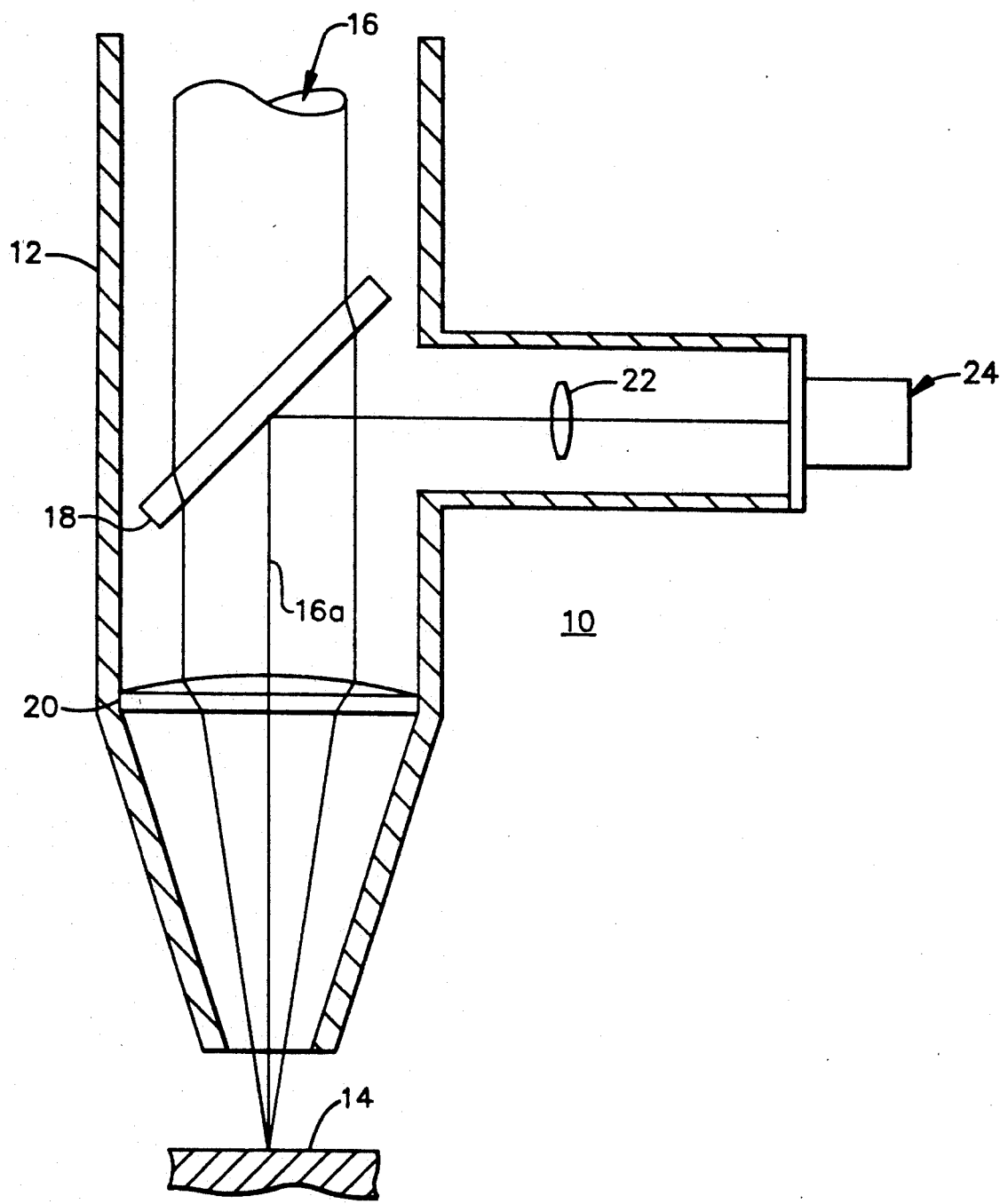
FIG. 2 is a schematic illustration, partly in section, of a first embodiment of a viewing device for a material processing laser apparatus according to the present invention.

Turning now to FIG. 2 illustrating the first embodiment of the present invention, as applied to a welding apparatus and, where parts of the apparatus similar to those in FIG. 1 are identified by the same reference characters, it is noted that the beam 16 entering the beam tube or housing 12 first passes through a ZnSe window 18 which is specially coated according to the present invention. In both exemplary embodiments of FIGS. 2 and 3, other than the structural differences, the beam 16 is a high power $CO_2$ laser beam having a wavelength of 10.6 $\mu$m. In order to accommodate such wavelength at a 45° angle of incidence, the top surface, as viewed in the drawing, of the window 18 has been coated to be antireflective (AR) at the $CO_2$ wavelength of 10.6 $\mu$m of the beam. AR coating used for 10.6 $\mu$m wavelength is typically Magnesium Difluoride ($MgF_2$), Cesium Dioxide ($CeO_2$), Silicon (Si) or a combination thereof. The AR coating in an exemplary embodiment on the top surface of the window 18 is approximately 1.5 microns. On the other hand, the bottom surface of the window 18 has been coated with a coating that is AR at 10.6 $\mu$m wavelength and HR (highly reflective) at the visible wavelengths. The AR/HR coating to have the dual reflective properties noted above, was made from or in an appropriate combination of $MgF_2$, $CeO_2$ and Si materials mentioned above and, in an exemplary embodiment, was given a thickness of approximately 2.5 microns. Such coating eliminates the formation of secondary reflections which, if present, would create secondary ghost images. Both of the above-mentioned coatings are manufactured according to customer's specification of a desired laser beam wavelength and of the reflective properties required and, coated on customer's optic by Two-Six Inc., Saxonburg, Pa., USA. The beam 16 is shifted insignificantly as it passes through the window 18 and continues down the tube 12 through a ZnSe lens 20 where it is focussed onto the workpiece 14. The laser interaction or the workpiece image is transmitted back up the tube 12 through the lens 20 to the window 18, as indicated by the beam 16a, where it is reflected by the bottom of the window 18 into the fine focussing optic 22 which focusses the image into the imaging system 24, where with appropriate intensifiers, scanners and processors, not shown in detail but well known in the art of image processing, such as in the X-ray, TV camera, thermal detection or direct microscopic viewing art, can be processed to evaluate all the data contained in the image for adjustment and control purposes. Such data without limitation, may include the real time data about substrate heating as a function of time and temperature, substrate melting, substrate vaporization, plasma generation and characteristics, filler metal additions and their effects on welding, weld puddle size, optical steering of joint tracking and focal distance for accurately controlling the process.

Figure 3:
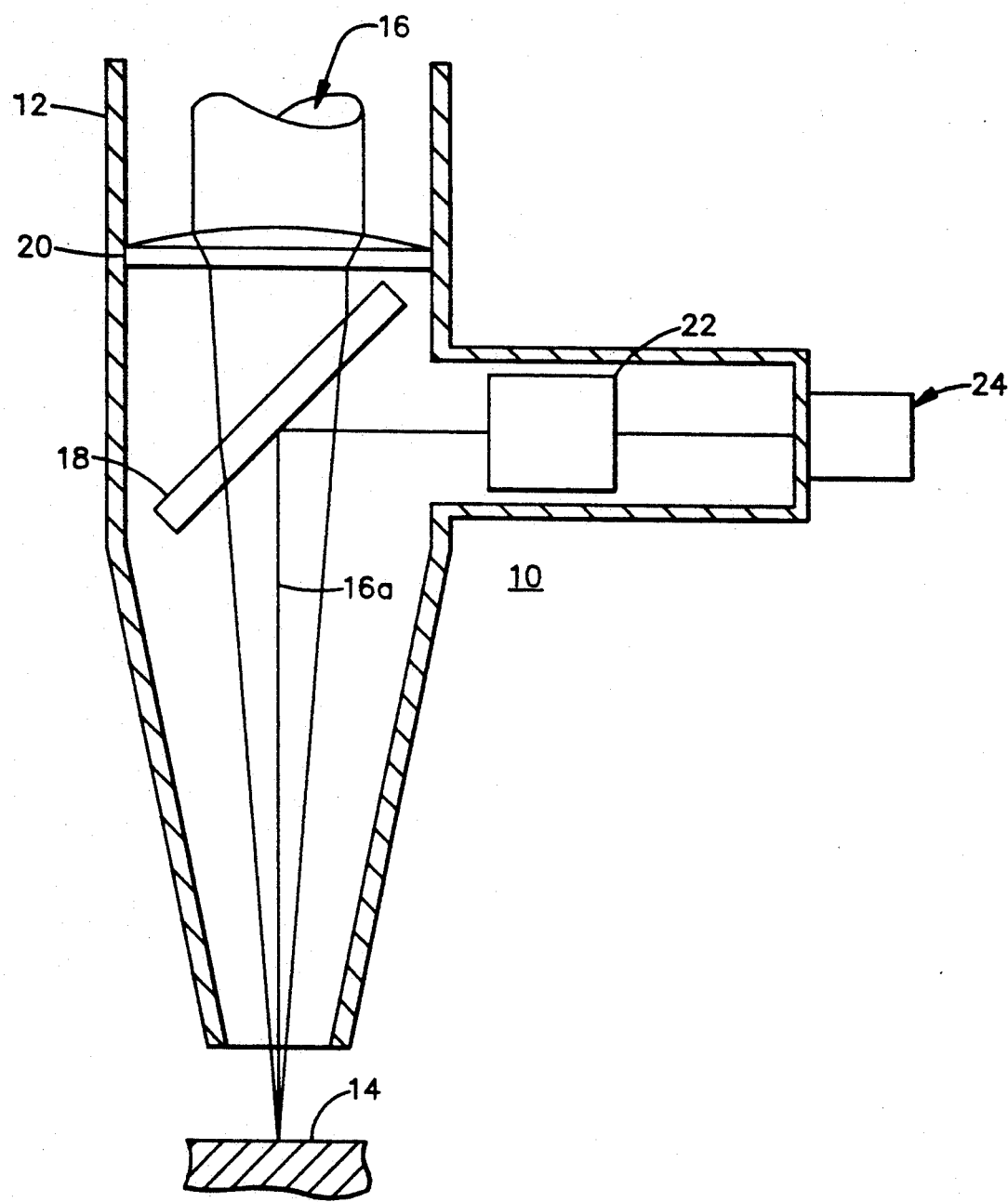
FIG. 3 is a similar illustration, as in FIG. 2, of another embodiment of the viewing device according to the present invention.

Turning now to FIG. 3 which illustrates the so called below the lens configuration of the $CO_2$ laser welding apparatus according to the present invention and in contrast to the above the lens configuration of FIG. 2, it is seen that beam 16 passes through the beam tube 12 to the focussing lens 20 where the converging beam passes through the AR coated window 18 and is focussed onto the workpiece 14. The coating of the ZnSe window 18 is similar to the coating described in connection with window 18 of FIG. 2. The workpiece image passes back up the beam tube 12, as indicated by the reflected image beam 16a, to the bottom surface of the window 18 through the fine focussing assembly 22, which is similar to that in FIG. 2, into the imaging system 24. It is noted that like parts are identified by like reference characters as in FIG. 2. The structural combination of FIG. 3 is desirable for cases if the particular equipment or characteristic which is being monitored does not transmit through the ZnSe lens 20.

It is noted that the optical window or flat 18 in both configurations of FIGS. 2 and 3 has been made from the material ZnSe, however, other materials could be used, such as, Galium Arsenide (GaAs) which more expensive, however it has the advantage of being reflective to a portion of the visible spectrum without special HR coatings, required for the ZnSe window material and described above. Salts including but not limited to NaCl and KCl could also be used for window 18.

It should be clear now from the above description that the viewing device according to the present invention has no moving parts after initial adjustment in the sense that no components of the optical system need to be moved in and out of the laser beam path during use. The fine adjustment is made once for a given lens system to focus the image and does not require additional adjustment or movement during use.

Also it is noted that the setting of the window at 45° is the optimum angle in such devices and should not be considered as a limitation. Other angles offer no special advantage, but are possible. Each different setting would require that the window 18 be coated to accommodate the new angle of incidence. Also the window mount must be modified to hold the window at the new angle. Also the fine focussing and imaging system would have to be reoriented along the new optical path 16a of the reflected image from the bottom surface of the image.

Window 18 has become known under various names, such as, optical wedge, optical flat, however, within the scope of the present invention they all function the same way as described under the terminology "window".

It can also be appreciated that the present inventive viewing device is intended to operated primarily, but not limited thereto, in a high power laser material processing environment, such as welding, where preferably $CO_2$ lasers are used, therefore, the material from which the optical window or flat 18 is made, and the coatings used thereon, are wavelength specific. In addition, the materials and coatings used must be capable of withstanding the effect of high laser powers, such as used in industrial welding and material processing applications.

While there has been described herein what are considered to be preferred embodiments of the present invention, other modifications of the invention shall be apparent to those skilled in the art from the teaching herein and, it is, therefore, desired to be secured in the appended claims all such modifications as fall within the true spirit and scope of the invention.

Accordingly, what is desired to be secured by letters patent of the United States is the invention as defined and differentiated in the appended claims.

What is claimed is:

1. An apparatus for material processing with a high power laser beam, comprising:
   optic means mounted in the path of said beam for permitting real-time observation of said processing, said optic means comprising an optical window with a first surface for receiving a laser beam from a laser source and a second surface positioned to deflect a reflected image of said processing for viewing, said first surface having a coating disposed thereon which is antireflective (AR) to the wavelength of said laser beam and said second surface having a coating which is AR to the wavelength of said laser beam and which is highly reflective (HR) to light energy at visible wavelengths.

2. The invention as claimed in claim 1, wherein said optical window is mounted at an angle of about 45° with respect to the path of said laser beam for deflecting the reflected image of said processing away from the path of said laser beam at an angle of about 90°.

3. The invention as claimed in claim 1, wherein said laser beam is a $CO_2$ laser beam and said coatings are antireflective at a wavelength of about 10.6 $\mu$m.

4. The invention as claimed in claim 1, wherein said coating on said first and second surfaces comprises a material selected from the group consisting of Magnesium Difluoride ($MgF_2$), Cesium Dioxide ($CeO_2$) and Silicon (Si).

5. The invention as claimed in claim 1, wherein said coating on said first and second surfaces comprises a combination of materials selected from the group consisting of Magnesium Difluoride ($MgF_2$), Cesium Dioxide ($CeO_2$) and Silicon (Si).

6. The invention as claimed in claim 1, wherein the coating on said first surface has a thickness of approximately 1.5 microns, and the coating on said second surface has a thickness of approximately 2.5 microns.

7. The invention as claimed in claim 1, wherein said optical window comprises a material selected from the group consisting of ZnSe, GaAs, NaCl and KCl.

8. The invention as claimed in claim 1, wherein said optic means further includes a focussing lens for focussing said laser beam onto a workpiece.

9. The invention as claimed in claim 8, wherein said focussing lens is mounted upstream of said optical window means with respect to the entry of said laser beam.

10. The invention as claimed in claim 8, wherein said focussing lens is mounted downstream of said optical window means with respect to the entry of said, laser beam.

11. An apparatus for material processing with a high power laser beam, comprising:
a beam tube including an entry side for said beam and an exit side for said beam proximate a workpiece;
an optical window mounted in the path of said beam with a first surface facing said entry side of said beam tube and a second surface facing said exit side of said beam tube, said first surface having a coating disposed thereon which is antireflective (AR) to the wavelength of said laser beam and said second surface having a coating which is AR to the wavelength of said laser beam and which is highly reflective (HR) at visible wavelengths.

12. The apparatus as claimed in claim 11, further comprising viewing means mounted away from the path of said laser beam, said optical window being mounted at a predetermined angle in said beam tube to deflect a reflected image of the material processing into said viewing means.

13. The apparatus as claimed in claim 12, wherein said viewing means includes focus adjusting means and an image processing means.

14. The apparatus as claimed in claim 11, wherein said laser beam is a $CO_2$ laser beam and said coatings are antireflective at a wavelength of about 10.6 $\mu$m.

15. The invention as claimed in claim 11, wherein said coating on said first and second surfaces comprises a material selected from the group consisting of Magnesium Difluoride ($MgF_2$), Cesium Dioxide ($CeO_2$) and Silicon (Si).

16. The invention as claimed in claim 11, wherein said coating on said first and second surfaces comprises a combination of materials selected from the group consisting of Magnesium Difluoride ($MgF_2$), Cesium Dioxide ($CeO_2$) and Silicon (Si).

17. The apparatus as claimed in claim 11, wherein the coating of said first surface has thickness of approximately 1.5 microns, and the coating on said second surface has a thickness of approximately 2.5 microns.

18. The apparatus as claimed in claim 11, wherein said optical window comprises a material selected from the group consisting of ZnSe, GaAs, NaCl and KCl.

19. The apparatus as claimed in claim 11, further comprising a focusing lens mounted upstream of said optical window with respect to the entry of said laser beam into said beam tube.

20. The apparatus as claimed in claim 11, further comprising a focusing lens mounted downstream of said optical window with respect to the entry of said laser beam into said beam tube.

21. The apparatus as claimed in claim 11, wherein said material processing is welding, cladding or drilling.

* * * * *